United States Patent Office 3,085,998
Patented Apr. 16, 1963

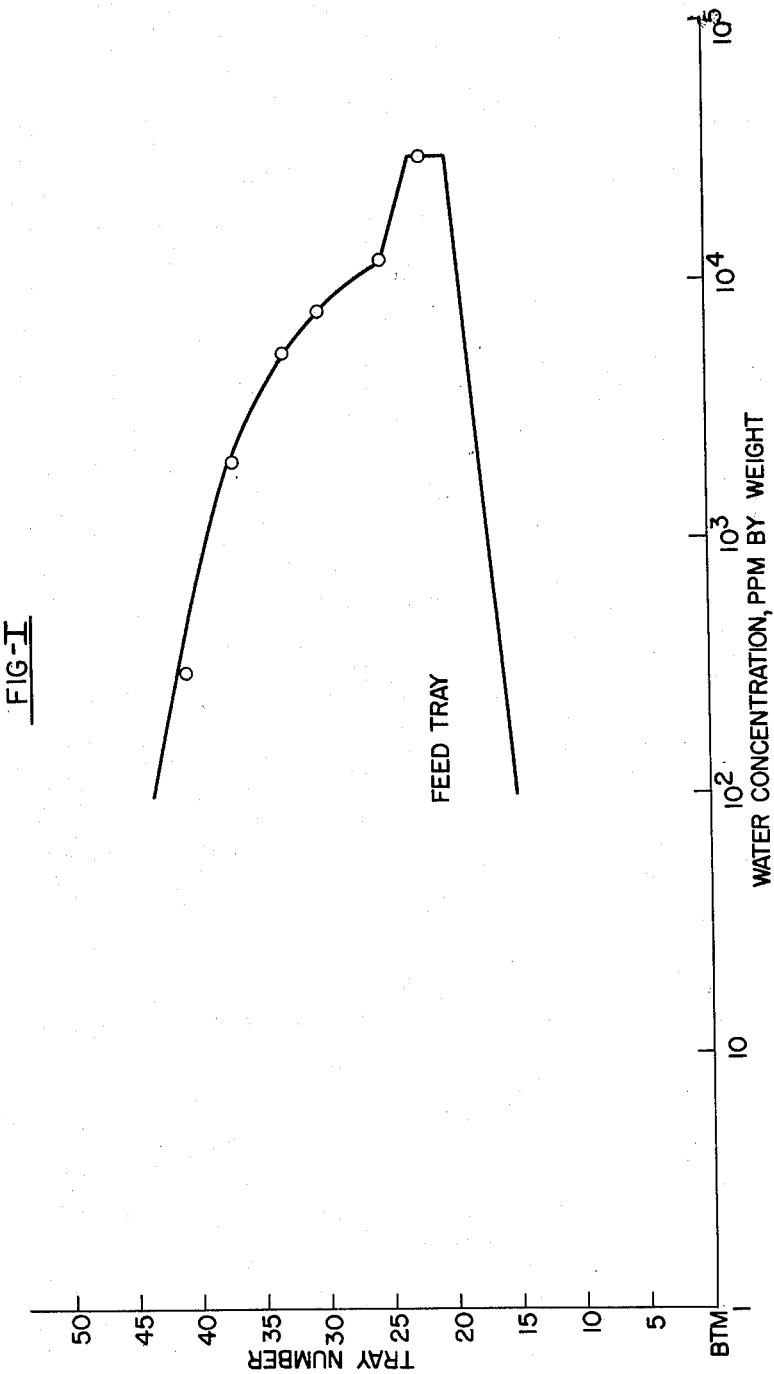

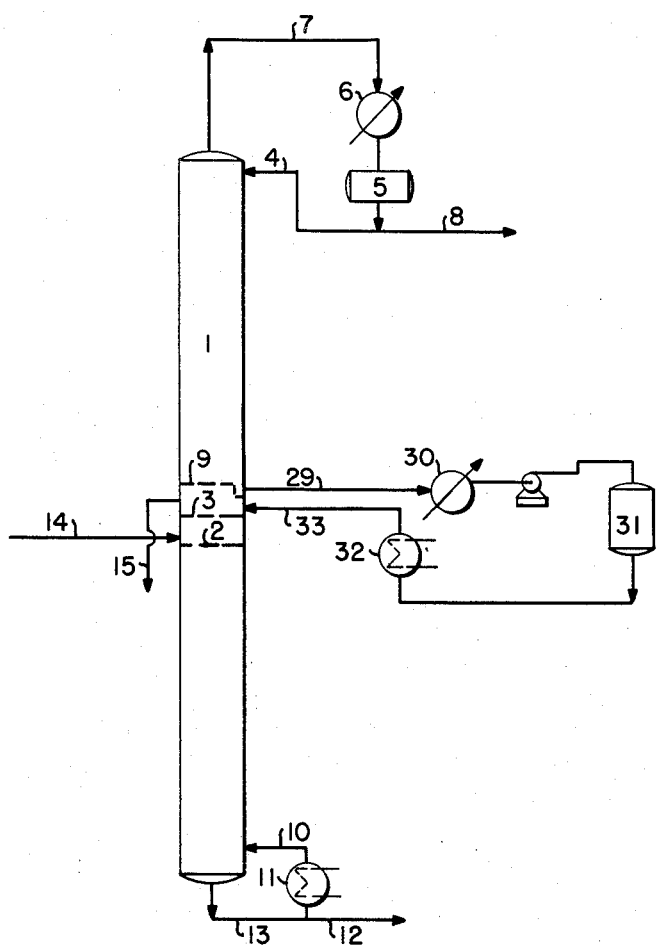
FIG.-II

3,085,998
DEHYDRATION OF POLYMERIZATION DILUENT
James Francis Ross, Baton Rouge, La., and Bruce R. Tegge, Madison, N.J., assignors to Esso Research and Engineering Company, a corporation of Delaware
Filed Sept. 23, 1959, Ser. No. 841,831
6 Claims. (Cl. 260—93.7)

This invention relates to an improved method of fractionating the polymerization diluent from the low pressure polymerization of alpha olefins. More particularly it relates to a process of this nature wherein the diluent methanol-hydrocarbon solvent mixture, containing inevitable small amounts of water contaminant, is fractionated in a tower with a water-rich sidestream being withdrawn.

The low pressure polymerization of alpha olefins with catalyst systems made up of a partially reduced, heavy, transition metal compound and a reducing metal-containing compound to high density, often isotactic, high molecular weight, solid, relatively linear products has been assuming ever increasing importance and is now well known.

For the purpose of convenience details of the low-pressure catalytic process and the products obtained thereby are presented below, although it should be realized that these by themselves constitute no part of this invention.

The alpha olefinic feeds utilized in polymerization and copolymerization include $C_2$ to $C_6$ olefins, e.g. ethylene, propylene, butene-1, hexene-1, etc., with ethylene and propylene preferred. The process is described in the literature, e.g. see U.K. Patent 810,023 and "Scientific American," September 1957, pages 98 et seq.

In this process the polymers are prepared by polymerizing the monomer with the aid of certain polymerization catalysts. The catalysts are solid, insoluble reaction products obtained by partially reducing a heavy metal compound of a group IV–B, V–B, and VI–B metal of the periodic system, such as vanadium tetrachloride, or a titanium halide, e.g. $TiCl_4$, $TiBr_4$, etc. preferably with metallic aluminum. The preferred catalyst of this type is usually prepared by reducing 1 mole of titanium tetrahalide, usually tetrachloride, with about one-third mole of aluminum to give a material corresponding to $TiCl_3 \cdot 0.33$ $AlCl_3$, thus containing cocrystallized $AlCl_3$. (For further details see copending U.S. application Serial No. 578,198, filed April 6, 1956 and Serial No. 766,376, filed October 19, 1958.) The product is then activated with an aluminum alkyl compound corresponding to the formula RR'AlX. In this formula R, R' and X preferably are alkyl groups of 2 to 8 carbon atoms, although R' and/or X may alternatively be hydrogen or a halogen, notably chlorine. Typical examples of the aluminum alkyl compounds are preferably aluminum triethyl, aluminum sesquichloride (a mixture of $AlEtCl_2$ and $AlEt_2Cl$), aluminum triisobutyl, etc.

The monomer is then contacted with the resulting catalyst in the presence of a hydrocarbon solvent. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5 wt. percent based on total liquid and the polymer product concentration in the polymerization zone is preferably kept between about 2 to 15% based on total contents so as to allow easy handling of the polymerized mixture. The proper polymer concentration can be obtained by having enough of the inert diluent present or by stopping the polymerization short of 100% conversion. When the desired degree of polymerization has been reached methanol is added to the reaction mixture for the purpose of dissolving and deactivating the catalyst, removing some catalyst residues from the polymer and for precipitating the crystalline polymer product from solution. During this step a small amount of water is formed, presumably from interaction of polymerization catalyst fragments with methanol.

The resultant methanol-hydrocarbon solvent-water containing mixture is separated from the precipitated polymer by conventional means such as filtration or centrifuging.

The polymers produced have number average molecular weights in the range of about 100,000 to 300,000 or even as high as 3,000,000 as determined by the intrinsic viscosity method using the I. Harris correlation (J. Polymer Science, 8 361, 1952). The polymers can have a high degree of crystallinity and a low solubility in n-heptane.

It is to be understood that the term "low pressure" polymer as used herein connotes material prepared in the indicated manner and includes homo- and copolymers.

In this process it is necessary that the hydrocarbon used as polymerization diluent and the methanol used as polymer wash liquid should each be substantially water free, i.e. preferably containing no more than 10 p.p.m. and 100 p.p.m. of water respectively. This is necessary because water acts as a catalyst poison in the former and serves to fix the catalyst residues as insoluble oxides or hydroxides in the latter making deashing difficult if not impossible.

In this process it is necessary that hydrocarbon diluent and methanol be reclaimed and recycled to the polymerization and washing section of the plant. This is because of the great expense involved in ridding these liquids of other poisons such as sulfur compounds, oxygenated impurities, etc. Therefore, the obvious method of maintaining an anhydrous system, by using once-through hydrocarbon and alcohol, is not economically feasible.

Several alternatives have been suggested for eliminating water from the system when recycling hydrocarbon and methanol. A methanol dehydration tower has been proposed. This is relatively expensive and ineffective in the overall process because of water that gets into the system by interaction of polymerization catalyst fragments with methanol, or by way of make-up xylene, wet inert gas, steam and water leaks in heat exchange equipment, etc. The use of a chemical reagent such as sodium or magnesium metal, sodium methylate is also very expensive and tends to foul heat exchange equipment by deposition of salts.

This invention provides an improved method of fractionating the polymerization diluent mixture. The method comprises fractionating the methanol-hydrocarbon solvent-water containing mixture in a fractionation tower in which the diluent stream is preferably fed into the tower as a vapor. A water-rich sidestream of methanol and solvent is withdrawn preferably as a liquid from the tower above the point of entry of the feed. The sidestream is cooled to a maximum of about 100° F. and passed through a desiccant to remove water above 1500 p.p.m. based on the total sidestream mixture and the desiccant effluent from which the water has been substantially removed is recycled back to the tower. A substantially water-free methanol stream is thus recovered overhead and a substantially water-free hydrocarbon solvent is recovered as a bottoms fraction. The solvent and methanol can then be recycled directly back to the process. Further details follow.

The polymerization diluent mixture encountered in the process and which requires fractionation contains methanol-hydrocarbon solvent and water usually in respective ranges of 30 to 70 weight percent, more usually 40 to 60 weight percent, 70 to 30 weight percent, more usually 40 to 60 weight percent and 50 to 1000 p.p.m., more usually in the range of 100 to 500 p.p.m.

The hydrocarbon solvents employed include aliphatic and aromatic solvents such as n-heptane, benzene, xylene, etc., with xylene preferred, all of which solvents boil above the boiling point of methanol.

The temperatures and pressures in the fractionation operation are respectively in the ranges of about 150° F. to 250° F. in the fractionator top, 280° F. to 450° F. at the fractionator bottom, at pressures of 0 to 100 p.s.i.g. The water-rich sidestream of methanol and solvent is withdrawn above the point of entry of the vapor feed, preferably 1 to 5 trays above. A profile showing the concentration of water in the sidestream from various trays is shown in the drawing FIGURE I. This profile shows how two liquid phases are present immediately above the feed tray thus permitting of decanting of the sidestream so that if desired only the water-rich phase can be sent to the desiccant for recovery of methanol.

It has been found that for the system employing xylene as polymerization diluent, when two liquid phases coexist on the trays immediately above the feed tray, that the phases have the following approximate composition:

|  | Phase | |
|---|---|---|
|  | Water Rich | Water Poor |
| Methanol | 75–80 | 15–20 |
| Water | 5+ | 0.6 |
| Xylene | Balance | |

Thus, it is possible by removing selectively only the water rich phase to maintain such a low internal concentration of water in the fractionator that the overhead and bottoms streams from the fractionator are sufficiently water free for reuse in the polymerization process.

The sidestream, after removal from the fractionator, can then be passed over a desiccant as described below to recover valuable methanol and hydrocarbon products, or alternatively discarded from the process if economic considerations warrant. In another modification of this invention, water is not allowed to build up in the fractionator to the extent that two coexisted liquid phases form.

The sidestream is cooled preferably to below 100° F. to increase desiccant efficiency. The stream is then passed through a desiccant such as anhydrous calcium sulfate, molecular sieves, etc. to remove water above 1500 p.p.m. in the case where calcium sulfate is used as desiccant. The substantially water-free methanol and hydrocarbon solvent recovered overhead and in the bottoms fraction contain no more than about 100 p.p.m. and 10 p.p.m., respectively, of water.

The water adsorbed on the desiccant can be removed by periodic regeneration by standard regeneration procedure, such as by heating to temperatures above 250° F. in the presence of a relatively dry sweep gas, etc. Several desiccant stages can be employed.

This invention will be better understood by reference to the flow diagram, FIGURE II, and the following examples.

This drawing has been restricted to the actual diluent fractionation without describing the polymerization operation which in itself is no part of this invention, in order to distinctly point out the precise invention claimed.

*Example 1*

In the drawing, FIGURE II shows a flow diagram for separating the diluent mixture. This diluent mixture arises from the polymerization of propylene with an aluminum-reduced TiCl$_4$-aluminum triethyl catalyst. The methanol-xylene-water mixture containing 821 pounds per hour of methanol, 815 pounds per hour of xylene, and analyzing 370 p.p.m. by weight of water is fed through line 14 into a 50 plate fractionation tower 1 at the twentieth plate 2 above the bottom of the tower. The overhead vapor, in line 7, flows into condenser 6 and reflux drum 5. The overhead product comprising 821 pounds per hour of methanol and 52 pounds per hour of xylene is returned to the polymerization process through line 8. The reflux stream of 1185 pounds per hour of methanol and 75 pounds per hour of xylene is pumped back into the top of the tower through line 4. The bottoms product, consisting of 763 pounds per hour of xylene, is removed through lines 13 and 12. Heat is supplied to the column by means of the reboiler 11 and line 10. A liquid sidestream composed of 8 pounds per hour of methanol, 1.5 pounds per hour of xylene and 0.5 pounds per hour of water is withdrawn from tower 1 through line 15 at the twenty-first plate 3 above the bottom of the tower. The tower is operated at a pressure of 0.7 p.s.i.g. in the tower overhead which corresponds to an overhead temperature of 151° F. and a bottoms temperature of 300° F. The feed is introduced as a vapor at a temperature of 208° F.

Under this set of conditions, the methanol-rich tower overhead product contains less than 100 p.p.m. by weight and is a suitable liquid for washing polymer. The xylene tower bottoms product contains less than 10 p.p.m. by weight of water, and is a suitable polymerization diluent.

*Example 2*

Under conditions of tower temperature and pressure, feed rate, reflux rate and product rates essentially identical to those employed in Example 1, except that the sidestream is removed intermittently at a rate of 2 gallons once every hour, substantially identical results are obtained. The methanol-rich overhead product contains less than 100 p.p.m. of water and is suitable for washing polymer. The xylene tower bottom product contains less than 10 p.p.m. by weight of water.

*Example 3*

Under substantially identical conditions to those employed in Example 1, and in the same tower, but with no sidestream withdrawal of methanol-xylene-water mixture, the xylene bottom stream again contains less than 10 p.p.m. by weight of water, and is suitable as a polymerization diluent; but the methanol-rich overhead product analyzes 800 p.p.m. water. This concentration of water is enough to cause significant increase in the ash content of the polymer, from 0.05 to 0.07 wt. percent dry ash.

*Example 4*

In this example, the feed rate and composition are essentially equal to that given in Example 1. However, the tower pressure is 50 p.s.i.g., the tower overhead temperature is 225° F., the tower bottom temperature is 408° F. Reflux is returned to the fractionator at a rate of 2300 pounds per hour of methanol and 150 pounds per hour of xylene. Feed is introduced as a vapor at 307° F.

Under these conditions, the liquid sidestream is removed from the fractionator at the twenty-second tray from the bottom 9 through line 29. It consists of a single liquid phase containing 130 pounds per hour of methanol, 1 pound per hour of water, and 180 pounds per hour of xylene. The stream is cooled from 300° F. to 100° F. in cooler 30 then passed through regenerative dryer 31 packed with anhydrous calcium sulfate. The calcium sulfate dehydrates the sidestream to a level of 1500 p.p.m. of water, absorbing substantially no methanol or xylene. The dried stream is returned through heater 32 to the twenty-first tray of the fractionator 3 through line 33. The calcium sulfate in dryer 31 is periodically regenerated by passing natural gas at 425° F. through the bed. Under these conditions, the fractionator overhead product contains 94% methanol, 6% xylene and less than 100 p.p.m. water. The xylene bottom stream contains less than 10 p.p.m. water.

As stated previously the substantially water-free methanol stream and hydrocarbon solvent stream can be recycled to the polymerization operation.

The advantages of this invention will be apparent to those skilled in the art. Economy of operation is achieved in a continuous process.

It is to be understood that this invention is not limited to the specific examples which have been offered merely as illustrations and that modifications may be made without departing from the spirit of the invention.

What is claimed is:

1. In a process for polymerizing a $C_2$–$C_6$ alpha olefin in the presence of a catalyst containing a partially reduced, heavy, transition metal halide and an aluminum alkyl compound in a hydrocarbon solvent higher boiling than methanol, wherein methanol is added to the reaction system to precipitate polymer product, followed by the separation of the resultant methanol-solvent-water-containing mixture therefrom the improved method of fractionating this mixture which comprises the steps of feeding the mixture in the vapor form into a fractionation zone; fractionating the mixture to withdraw a water-rich sidestream of methanol and hydrocarbon solvent from the tower above the point of entry of the feed; cooling the withdrawn sidestream to a temperature below 100° F.; passing the cooled sidestream through a desiccant to remove water therefrom; recycling the residual sidestream fraction back to the fractionation zone; taking overhead a substantially water-free methanol and as bottoms a substantially water-free hydrocarbon solvent from the fractionation zone and recycling the water-free methanol stream to the polymerization step.

2. The process of claim 1 in which the hydrocarbon solvent is xylene and in which the components in the methanol-solvent-water-containing mixture are present in the respective ranges of 30–70 wt. percent, 70–30 wt. percent and 50–1000 p.p.m.

3. The process of claim 2 in which the substantially water-free hydrocarbon stream is recycled to the polymerization operation.

4. The process of claim 2 in which the desiccant is calcium sulfate.

5. The process of claim 2 in which the substantially water-free methanol and the substantially water-free solvent contain maxima of 100 p.p.m. and 10 p.p.m. water respectively.

6. The process of claim 2 in which water above 1500 p.p.m. is removed in the desiccant contacting step.

References Cited in the file of this patent

UNITED STATES PATENTS

| | | |
|---|---|---|
| 2,549,290 | Congdon et al. | Apr. 17, 1951 |
| 2,862,917 | Anderson et al. | Dec. 2, 1958 |
| 2,904,486 | Bown et al. | Sept. 15, 1959 |

OTHER REFERENCES

Perry: "Chemical Engineers' Handbook," Third Edition, McGraw-Hill (1950), pages 622–639.

Weissberger: "Technique of Organic Chemistry," vol. III, second edition, part I, "Separation and Purification," Interscience Publishers Inc., New York (1956), page 824.